(12) United States Patent  
Fontvieille et al.

(10) Patent No.: US 8,931,271 B2  
(45) Date of Patent: Jan. 13, 2015

(54) METHOD FOR DETERMINING A POSITION SET POINT OF A BY-PASS ACTUATOR, INTENDED FOR A TURBOSUPERCHARGER

(75) Inventors: Laurent Fontvieille, Gif sur Yvette (FR); Arnaud Guinois, Paris (FR); Philippe Moulin, Paris (FR); Olivier Grondin, Bougival (FR)

(73) Assignee: Renault S.A.S., Boulogne Billancourt (FR)

( * ) Notice: Subject to any disclaimer, the term of this patent is extended or adjusted under 35 U.S.C. 154(b) by 529 days.

(21) Appl. No.: 13/262,404

(22) PCT Filed: Feb. 11, 2010

(86) PCT No.: PCT/FR2010/050234  
§ 371 (c)(1),  
(2), (4) Date: May 22, 2012

(87) PCT Pub. No.: WO2010/112718  
PCT Pub. Date: Oct. 7, 2010

(65) Prior Publication Data  
US 2012/0222417 A1  Sep. 6, 2012

(30) Foreign Application Priority Data  
Mar. 30, 2009  (FR) ...................... 09 51992

(51) Int. Cl.  
*F02D 23/00* (2006.01)  
*F02B 33/44* (2006.01)  
(Continued)

(52) U.S. Cl.  
CPC ........ *F02D 23/00* (2013.01); *F02D 2041/1434* (2013.01); *Y02T 10/144* (2013.01)  
USPC ................ 60/602; 60/611; 60/612; 701/102; 701/103

(58) Field of Classification Search  
CPC ............ F02D 23/00; F02D 2041/1434; Y02T 10/144  
USPC .............................. 60/602, 611, 612; 701/703  
See application file for complete search history.

(56) References Cited

U.S. PATENT DOCUMENTS 5,203,683 A * 4/1993 Yoshikawa et al. ........... 417/440  
5,454,360 A * 10/1995 Shimizu et al. ............... 123/564  
(Continued)

FOREIGN PATENT DOCUMENTS

DE  39 39 754  6/1991  
DE  196 20 778  8/1997  
(Continued)

OTHER PUBLICATIONS

International Search Report issued May 4, 2010 in PCT/FR10/050234 filed Feb. 11, 2010.

*Primary Examiner* — Thai Ba Trieu  
*Assistant Examiner* — Ngoc T Nguyen  
(74) *Attorney, Agent, or Firm* — Oblon, Spivak, McClelland, Maier & Neustadt, L.L.P.

(57) ABSTRACT

A method for a turbocharger of a heat engine including a turbine, a compressor, and a by-pass actuator that can be used to control an air flow that does not pass through the turbine. The method includes determining a position set point of the by-pass actuator as a function of a compression ratio set point, a compression ratio measurement, a measurement of the rate of flow through the compressor, a measurement of the pressure downstream from the turbine, a measurement of the pressure downstream from the compressor, a measurement of the temperature upstream from the turbine, and a measurement of the temperature upstream from the compressor. The method can be used to control a supercharging device with a single or dual turbocharger.

19 Claims, 11 Drawing Sheets

(51) Int. Cl.
   *G06F 19/00* (2011.01)
   *G06F 7/00* (2006.01)
   *F02D 41/14* (2006.01)

(56) References Cited

U.S. PATENT DOCUMENTS

| | | | |
|---|---|---|---|
| 6,058,706 A | 5/2000 | Aschner et al. | |
| 6,922,995 B2 * | 8/2005 | Kawamura et al. | 60/608 |
| 8,091,358 B2 * | 1/2012 | Panciroli | 60/602 |
| 8,276,378 B2 * | 10/2012 | Song et al. | 60/602 |
| 8,567,192 B2 * | 10/2013 | Chi et al. | 60/612 |
| 2006/0213194 A1 | 9/2006 | Hasegawa | |
| 2008/0053088 A1 | 3/2008 | Yanakiev | |
| 2011/0225967 A1 * | 9/2011 | Karnik et al. | 60/602 |
| 2012/0137676 A1 * | 6/2012 | Murata et al. | 60/602 |
| 2013/0282256 A1 * | 10/2013 | Watanuki et al. | 701/102 |
| 2014/0137552 A1 * | 5/2014 | Yokono et al. | 60/600 |

FOREIGN PATENT DOCUMENTS

| | | | |
|---|---|---|---|
| DE | 10 2007 000324 | 12/2007 | |
| FR | 2903147 A1 * | 1/2008 | F02B 37/18 |

\* cited by examiner

|        | 1000   | 1450   | 1900   | 2350   | 2800   | 3250   | 3700   | 4150   | 4600   | 5050   | 5500   |
|--------|--------|--------|--------|--------|--------|--------|--------|--------|--------|--------|--------|
| 1.0448 | 82620  | 57760  | 84540  | 99740  | 109860 | 115670 | 121270 | 95270  | 63150  | 47120  | 47240  |
| 1.2636 | 111590 | 123220 | 124270 | 134090 | 147210 | 162620 | 183570 | 183890 | 156600 | 263440 | 263440 |
| 1.4823 | 127610 | 136440 | 150690 | 168560 | 186120 | 208440 | 235910 | 263440 | 263440 | 263440 | 263440 |
| 1.7011 | 144770 | 162980 | 168290 | 191580 | 218090 | 240160 | 263440 | 263440 | 263440 | 263440 | 263440 |
| 1.9198 | 162490 | 187460 | 195470 | 218140 | 241670 | 263440 | 263440 | 263440 | 263440 | 263440 | 263440 |
| 2.1386 | 180260 | 209840 | 223850 | 237760 | 251140 | 263440 | 263440 | 263440 | 263440 | 263440 | 263440 |
| 2.3574 | 199730 | 221340 | 231820 | 244660 | 257660 | 263440 | 263440 | 263440 | 263440 | 263440 | 263440 |
| 2.5761 | 219500 | 239320 | 244840 | 254110 | 263440 | 263440 | 263440 | 263440 | 263440 | 263440 | 263440 |
| 2.7949 | 244050 | 256160 | 259050 | 263440 | 263440 | 263440 | 263440 | 263440 | 263440 | 263440 | 263440 |
| 3.0136 | 260080 | 263440 | 249050 | 263440 | 263440 | 263440 | 263440 | 263440 | 263440 | 263440 | 263440 |

|  | 1000 | 1450 | 1900 | 2350 | 2800 | 3250 | 3700 | 4150 | 4600 | 5050 | 5500 |
|---|---|---|---|---|---|---|---|---|---|---|---|
| 0.9784 | 36610 | 17710 | 46340 | 49010 | 50480 | 49410 | 31410 | 14210 | 4500 | 0 | 0 |
| 1.3483 | 60660 | 68380 | 70040 | 71300 | 70960 | 66910 | 58050 | 54280 | 70940 | 79550 | 82460 |
| 1.7182 | 78700 | 92160 | 96430 | 96130 | 95920 | 97360 | 97780 | 99270 | 101190 | 103220 | 106110 |
| 2.0881 | 97160 | 110070 | 113910 | 114410 | 113790 | 113230 | 112470 | 113410 | 115600 | 117610 | 116350 |
| 2.458 | 115360 | 126370 | 128860 | 128970 | 128300 | 127440 | 127050 | 126690 | 128210 | 128570 | 126920 |
| 2.8279 | 132460 | 142960 | 143500 | 140110 | 140170 | 139300 | 138860 | 139710 | 140350 | 138800 | 137440 |
| 3.1978 | 147560 | 154070 | 148510 | 149710 | 150750 | 150260 | 150410 | 152050 | 150860 | 148870 | 147500 |
| 3.5677 | 156990 | 156390 | 156840 | 157370 | 160190 | 159140 | 160280 | 160340 | 160360 | 158570 | 156710 |
| 3.9376 | 164540 | 164160 | 163750 | 166070 | 169730 | 169480 | 168450 | 168730 | 168630 | 167340 | 164680 |
| 4.3075 | 171070 | 171110 | 171160 | 171230 | 172250 | 173010 | 174290 | 175410 | 175690 | 174440 | 171000 |

|  | 1.1 | 1.24 | 1.38 | 1.52 | 1.66 | 1.8 | 1.94 | 2.08 | 2.22 | 2.36 | 2.5 |
|---|---|---|---|---|---|---|---|---|---|---|---|
| 31000 | -0.1859 | 0.2604 | 0.5336 | 0.4632 | 0.3269 | 0.3607 | 0.4242 | 0.4809 | 0.5367 | 0.5483 | 0.5483 |
| 54330 | -0.0733 | 0.4531 | 0.6779 | 0.7976 | 0.545 | 0.5939 | 0.5976 | 0.5882 | 0.5601 | 0.5633 | 0.5633 |
| 77670 | -0.0038 | 0.3604 | 0.5936 | 0.7357 | 0.774 | 0.6773 | 0.632 | 0.6271 | 0.5995 | 0.5781 | 0.5781 |
| 101000 | 0 | 0.2121 | 0.3532 | 0.5369 | 0.719 | 0.7591 | 0.7018 | 0.6618 | 0.6242 | 0.5928 | 0.5928 |
| 124330 | 0 | 0 | 0.1596 | 0.3435 | 0.5478 | 0.7393 | 0.7613 | 0.6176 | 0.5929 | 0.5976 | 0.6072 |
| 147670 | 0 | 0 | 0 | 0.159 | 0.3611 | 0.6047 | 0.7932 | 0.6311 | 0.6231 | 0.641 | 0.6121 |
| 171000 | 0 | 0 | 0 | 0 | 0.2263 | 0.4941 | 0.7272 | 0.7355 | 0.6633 | 0.6865 | 0.5935 |
| 194330 | 0 | 0 | 0 | 0 | 0.1077 | 0.3566 | 0.6106 | 0.7865 | 0.7204 | 0.6805 | 0.5691 |
| 217670 | 0 | 0 | 0 | 0 | 0 | 0.2079 | 0.4211 | 0.6497 | 0.7495 | 0.6656 | 0.5573 |
| 241000 | 0 | 0 | 0 | 0 | 0 | 0.0005 | 0.2152 | 0.5036 | 0.6799 | 0.6593 | 0.5752 |
| 251000 | 0 | 0 | 0 | 0 | 0 | 0 | 0.1472 | 0.3315 | 0.5184 | 0.6445 | 0.6295 |

|        | 1.1    | 1.32   | 1.54   | 1.76   | 1.98   | 2.2     | 2.42   | 2.64   | 2.86   | 3.08   | 3.3    |
|--------|--------|--------|--------|--------|--------|---------|--------|--------|--------|--------|--------|
| 31000  | 0.4093 | 0.5093 | 0.4897 | 0.4445 | 0.4012 | 0.3673  | 0.3491 | 0.4203 | 0.4528 | 0.4689 | 0.4689 |
| 45440  | 0.2796 | 0.5106 | 0.64   | 0.7222 | 0.6196 | 0.5277  | 0.493  | 0.4869 | 0.4865 | 0.4901 | 0.4901 |
| 59890  | 0.138  | 0.3228 | 0.4866 | 0.6175 | 0.7228 | 0.6687  | 0.6058 | 0.5546 | 0.5203 | 0.5113 | 0.5113 |
| 74330  | 0      | 0.154  | 0.2926 | 0.4451 | 0.6778 | 0.7286  | 0.6509 | 0.649  | 0.5634 | 0.5324 | 0.5324 |
| 88780  | 0      | 0      | 0.1364 | 0.3515 | 0.4708 | 0.6555  | 0.7371 | 0.6684 | 0.6063 | 0.5536 | 0.5536 |
| 103220 | 0      | 0      | 0      | 0.1399 | 0.3129 | 0.5677  | 0.7074 | 0.688  | 0.656  | 0.5806 | 0.5748 |
| 117670 | 0      | 0      | 0      | 0      | 0.183  | 0.3935  | 0.6383 | 0.7152 | 0.6882 | 0.6082 | 0.5969 |
| 132110 | 0      | 0      | 0      | 0      | 0.0851 | 0.3262  | 0.54   | 0.6962 | 0.6911 | 0.6195 | 0.6219 |
| 146560 | 0      | 0      | 0      | 0      | 0      | 0.1873  | 0.3923 | 0.6061 | 0.7237 | 0.6532 | 0.6484 |
| 161000 | 0      | 0      | 0      | 0      | 0      | -0.0188 | 0.1843 | 0.4864 | 0.7222 | 0.6814 | 0.6748 |
| 171000 | 0      | 0      | 0      | 0      | 0      | 0       | 0.1831 | 0.4154 | 0.6535 | 0.7243 | 0.6965 |

|  | 30000 | 51000 | 72000 | 93000 | 114000 | 135000 | 156000 | 177000 | 198000 | 219000 | 236590 |
|---|---|---|---|---|---|---|---|---|---|---|---|
| 0.01 | 1.5481 | 1.292 | 1.1567 | 1.2799 | 1.3743 | 1.4712 | 1.6161 | 1.7644 | 1.6522 | 1.5105 | 1.6 |
| 0.0478 | 2.0115 | 1.7931 | 1.5484 | 1.5914 | 1.6047 | 1.6319 | 1.6319 | 1.67 | 1.6874 | 1.7193 | 1.9223 |
| 0.0856 | 2.5294 | 2.2053 | 1.9182 | 1.897 | 1.8264 | 1.8613 | 1.9849 | 1.9041 | 1.9616 | 2.0069 | 2.2816 |
| 0.1233 | 3 | 2.59 | 2.24 | 2.1195 | 2.0279 | 2.0806 | 2.1114 | 2.1037 | 2.1831 | 2.2898 | 2.4068 |
| 0.1611 | 3 | 3 | 2.54 | 2.33 | 2.22 | 2.2091 | 2.223 | 2.2573 | 2.355 | 2.5081 | 2.5404 |
| 0.1989 | 3 | 3 | 2.84 | 2.57 | 2.43 | 2.37 | 2.35 | 2.4007 | 2.4966 | 2.6237 | 2.6765 |
| 0.2367 | 3 | 3 | 3 | 2.81 | 2.64 | 2.55 | 2.52 | 2.53 | 2.6123 | 2.7114 | 2.8011 |
| 0.2744 | 3 | 3 | 3 | 3 | 2.84 | 2.74 | 2.7 | 2.7 | 2.74 | 2.81 | 2.9 |
| 0.3122 | 3 | 3 | 3 | 3 | 3 | 2.92 | 2.86 | 2.86 | 2.89 | 2.97 | 3 |
| 0.35 | 3 | 3 | 3 | 3 | 3 | 3 | 3 | 3 | 3 | 3 | 3 |

|  | 31000 | 43000 | 55000 | 67000 | 79000 | 91000 | 103000 | 115000 | 127000 | 139000 | 149680 |
|---|---|---|---|---|---|---|---|---|---|---|---|
| 0.01 | 1.7295 | 1.4809 | 1.2415 | 1.3215 | 1.3755 | 1.5143 | 1.6077 | 1.7736 | 1.6283 | 1.2438 | 1.31 |
| 0.1644 | 2.278 | 2.0232 | 1.6871 | 1.4217 | 1.6107 | 1.687 | 1.6823 | 1.6701 | 1.63 | 1.5914 | 1.5169 |
| 0.3189 | 2.9117 | 2.6215 | 2.2451 | 2.1515 | 2.0029 | 2.0522 | 2.0564 | 2.0907 | 2.1185 | 2.0965 | 1.8153 |
| 0.4733 | 3.5 | 3.1 | 2.75 | 2.5592 | 2.3883 | 2.3615 | 2.3722 | 2.4047 | 2.5016 | 2.4152 | 2.162 |
| 0.6278 | 3.5 | 3.5 | 3.19 | 2.93 | 2.76 | 2.66 | 2.6491 | 2.6791 | 2.7112 | 2.702 | 2.5138 |
| 0.7822 | 3.5 | 3.5 | 3.5 | 3.29 | 3.09 | 2.96 | 2.88 | 2.8815 | 2.8796 | 2.8693 | 2.8275 |
| 0.9367 | 3.5 | 3.5 | 3.5 | 3.5 | 3.41 | 3.25 | 3.15 | 3.09 | 3.06 | 3.05 | 3.06 |
| 1.0911 | 3.5 | 3.5 | 3.5 | 3.5 | 3.5 | 3.5 | 3.41 | 3.33 | 3.29 | 3.28 | 3.29 |
| 1.2456 | 3.5 | 3.5 | 3.5 | 3.5 | 3.5 | 3.5 | 3.5 | 3.5 | 3.5 | 3.5 | 3.5 |
| 1.4 | 3.5 | 3.5 | 3.5 | 3.5 | 3.5 | 3.5 | 3.5 | 3.5 | 3.5 | 3.5 | 3.5 |

US 8,931,271 B2

METHOD FOR DETERMINING A POSITION SET POINT OF A BY-PASS ACTUATOR, INTENDED FOR A TURBOSUPERCHARGER

BACKGROUND

The present invention relates to engine management and more particularly to the operation of a turbocharger-type supercharging device using a method for determining a position setpoint of a turbine bypass actuator as a function of a compression ratio setpoint.

The invention applies to a supercharging device comprising a fixed-geometry turbocharger, or alternatively two such turbochargers mounted in series.

With the increase in performance of supercharged engines, the boost pressure levels are increasing and the demands on the turbochargers are ever increasing. It is important for these turbochargers to be operated as carefully as possible in order to avoid turbocharger damage while at the same time improving the responsiveness of the vehicle under acceleration.

As emissions standards become ever tighter, the amount of particulate matter discharged by an engine has to be ever lower. A particle filter, or PF, is one solution for reducing the amount of particulate matter discharged into the environment. It is made up of a set of microchannels in which the majority of the particles become trapped. Once the filter is full, it has to be emptied by burning off the particles, this phase being known as "regeneration". Regeneration can be achieved either using a heating device, or by special engine settings. The particle filter is positioned in the exhaust line downstream of the low-pressure turbine.

The incorporation of such a device produces an increase in the exhaust back-pressure. The more laden with particles the filter becomes, the greater this back-pressure. This exhaust back-pressure manifests itself in relation to the turbocharger by a reduction in expansion ratio, leading to a reduction in the power supplied by the exhaust gases to the turbines and a drop in engine performance. In order to obtain the same level of performance, the expansion ratio has to be maintained by increasing the pressure upstream of the turbine. An increase in the pressure upstream of the turbines is achieved by suitable closure of the bypass actuators. Commands issued to these actuators can be used to operate the supercharging device.

DESCRIPTION OF THE RELATED ART

In the field of the operation of such double supercharging devices, the Applicant Company has developed a two-loop control method that simultaneously operates the two turbochargers and is described in patent application FR 08 53686 filed on 4 Jun. 2008. Such a system yields remarkable performance but requires an exhaust pressure sensor upstream of the high-pressure turbine. Installing such a sensor is expensive. The present invention proposes dispensing with this sensor.

BRIEF SUMMARY

To do so, the control method advantageously uses a compressor compression ratio variable to operate one turbocharger, when there is only one. In addition, when there are two turbochargers, the method replaces double-loop control with control of one or other of the turbochargers at any given moment, combined with a handler which selects which turbocharger is to be operated.

The subject of the invention is a method, for a turbocharger for supercharging a combustion engine comprising a turbine driven by the exhaust gases, a compressor driven in rotation by the turbine so as to compress the intake air, and a bypass actuator for bypassing the turbine making it possible to command an air flowrate that does not pass through the turbine, said method determining a position setpoint for the bypass actuator as a function of a compression ratio setpoint, of a compression ratio measurement, of a flowrate measurement of the flowrate through the compressor, of a pressure measurement of the pressure downstream of the turbine, of a pressure measurement of the pressure downstream of the compressor, of a temperature measurement of the temperature upstream of the turbine, and of a temperature measurement of the temperature upstream of the compressor.

According to another feature of the invention, determining a position setpoint for the bypass actuator comprises:
  determining an expansion ratio setpoint as a function of the compression ratio setpoint and of the compression ratio measurement,
  determining a position setpoint for the bypass actuator as a function of the expansion ratio setpoint thus determined.

According to another feature of the invention, the determining of the position setpoint for the bypass actuator, as a function of the expansion ratio setpoint uses an inverse actuator model.

According to another feature of the invention, the expansion ratio setpoint is, prior to use of the inverse actuator model, saturated as a function of a maximum authorized pressure downstream of the turbine, using the formula:

$$PR_{t,sp,sat} = \min\left(PR_{t,sp}, \frac{P_{dt,max}}{P_{dt}}\right),$$

where
$PR_{t,sp,sat}$ is the expansion ratio setpoint after saturation,
$PR_{t,sp}$ is the expansion ratio setpoint before saturation,
$P_{dt}$ is the pressure downstream of the turbine,
$P_{dt,max}$ is the maximum acceptable pressure downstream of the turbine,
the saturated compression ratio setpoint value thereafter replacing the initial compression ratio setpoint value.

According to another feature of the invention, the expansion ratio setpoint is equal to the sum of an open-loop expansion ratio setpoint calculated as a function of the compression ratio setpoint by a prepositioning module, and of a closed-loop expansion ratio setpoint calculated as a function of an error between the compression ratio setpoint and the compression ratio measurement by a first controller module.

According to another feature of the invention, the position setpoint for the bypass actuator is equal to the sum of an open-loop position setpoint calculated as a function of the compression ratio setpoint, and of a closed-loop position setpoint calculated as a function of an error between the compression ratio setpoint and the compression ratio measurement by a second controller module.

According to another feature of the invention, the determining of the open-loop position setpoint comprises the steps of:
  determining an open-loop expansion ratio setpoint as a function of the compression ratio setpoint by a prepositioning module,
  determining of an open-loop position setpoint as a function of the open-loop expansion ratio setpoint thus determined, using an inverse actuator model.

According to another feature of the invention, the position setpoint is finally saturated, using the formula:

$$\alpha_{sp,sat} = \min(\alpha_{sp,max}),$$

where
$\alpha_{sp,sat}$ is the position setpoint after saturation,
$\alpha_{sp}$ is the position setpoint before saturation,
$\alpha_{sp,max}$ is a maximum position setpoint.

According to another feature of the invention, the maximum position setpoint is determined as a function of the open-loop expansion ratio using an inverse actuator model.

According to another feature of the invention, the open-loop expansion ratio setpoint is, prior to application of the inverse actuator model for determining the maximum position setpoint, saturated as a function of a maximum authorized pressure downstream of the turbine, using the formula:

$$PR_{t,sp,sat} = \min\left(PR_{t,sp,ol}, \frac{P_{dt,max}}{P_{dt}}\right),$$

where
$PR_{t,sp,sat}$ is the expansion ratio setpoint after saturation,
$PR_{t,sp}$ is the expansion ratio setpoint before saturation,
$P_{dt}$ is the pressure downstream of the turbine,
$P_{dt,max}$ is the maximum acceptable pressure downstream of the turbine,
the saturated expansion ratio setpoint value thereafter replacing the initial open-loop expansion ratio setpoint value.

According to another feature of the invention, the prepositioning module comprises the following steps:
determining a corrected flowrate measurement for the flowrate of intake air through the compressor as a function of a flowrate measurement for the flowrate of intake air through the compressor, using the formula:

$$W_{c,m,cor} = W_{c,m} \cdot \sqrt{\frac{T_{uc}}{T_{c,ref}}} \cdot \frac{P_{c,ref}}{P_{dc}},$$

where
$W_{c,m,cor}$ is the corrected flowrate measurement for the flowrate of intake air through the compressor,
$W_{c,m}$ is the air flowrate measurement for the flowrate of intake air through the compressor,
$T_{uc}$ is a temperature upstream of the compressor,
$P_{uc}$ is a pressure upstream of the compressor,
$T_{c,ref}$ is a reference temperature of the compressor,
$P_{c,ref}$ is a reference pressure of the compressor,
determining a corrected speed setpoint relative to the compressor, using a function of the compression ratio and of the corrected flowrate of intake air through the compressor, said function being defined by a two-dimensional map,
determining a speed setpoint as a function of the corrected speed setpoint relative to the compressor, using the formula:

$$N_{sp} = N_{sp,corc} \sqrt{\frac{T_{uc}}{T_{c,ref}}},$$

where
$N_{sp}$ is the speed setpoint of the turbocharger,
$N_{sp,corc}$ is the corrected speed setpoint relative to the compressor of the turbocharger,
$T_{uc}$ is the temperature upstream of the compressor,
$T_{c,ref}$ is the reference temperature of the compressor,
calculating an efficiency of the compressor as a function of the corrected speed setpoint relative to the compressor of the turbocharger and of the corrected air flowrate setpoint for the flowrate of intake air through the compressor, using a function of the corrected speed setpoint relative to the compressor of the turbocharger and of the corrected air flowrate setpoint for the flowrate of intake air through the compressor, said function being defined by a two-dimensional map,
calculating a compressor power setpoint, using the formula:

$$H_{c,sp} = W_{c,m} Cp_c \frac{1}{\eta_c} T_{uc} \left(PR_{c,sp}^{\frac{\gamma_c-1}{\gamma_c}} - 1\right),$$

where
$H_{c,sp}$ is the power setpoint of the compressor,
$W_{c,m}$ is the air flowrate measurement for the flowrate of intake air through the compressor,
$\eta_c$ is the efficiency of the compressor,
$T_{uc}$ is the temperature upstream of the compressor,
$PR_{c,sp}$ is the compression ratio setpoint of the compressor,
$Cp_c$ is a first thermodynamic constant of the intake air,
$\gamma_c$ is a second thermodynamic constant of the intake air,
calculating a turbine power setpoint using the formula:

$$H_{t,sp} = H_{c,sp},$$

where
$H_{t,sp}$ is the power setpoint of the turbine,
$H_{c,sp}$ is the power setpoint of the compressor,
determining a corrected speed setpoint relative to the turbine as a function of the speed setpoint, using the formula:

$$N_{sp,cort} = N_{sp} \sqrt{\frac{T_{t,ref}}{T_{ut}}},$$

where
$N_{sp}$ is the speed setpoint of the turbocharger,
$N_{sp,cort}$ is the corrected speed setpoint relative to the turbine of the turbocharger,
$T_{ut}$ is a temperature upstream of the turbine,
$T_{t,ref}$ is a reference temperature of the turbine,
calculating the open-loop expansion ratio setpoint, using the formula:

$$PT_{t,sp,ol} = F^{-1}\left(\frac{H_{c,sp}}{Cp_t \cdot T_{ut} \cdot \frac{P_{dt}}{P_{t,ref}} \cdot \sqrt{\frac{T_{t,ref}}{T_{ut}}}}, N_{sp,cort}\right),$$

where
$PR_{t,sp,ol}$ is the open-loop expansion ratio of the turbine,
$H_{t,sp}$ is the power setpoint of the turbine,
$N_{sp,cort}$ is the corrected speed setpoint relative to the turbine of the turbocharger, and F is a function defined by a two-dimensional map and obtained by the inversion of the following equation:

$$H_{t,sp} = W_{t,sp} \cdot Cp_t \cdot \eta_t \cdot T_{ut} \left[1 - \left(\frac{1}{PR_{t,sp,ol}}\right)^{\frac{\gamma_t-1}{\gamma_t}}\right],$$

where $H_{t,sp}$ is the power setpoint of the turbine,
$PR_{t,sp,ol}$ is the open-loop expansion ratio of the turbine,
$Cp_t$ is a first thermodynamic constant of the exhaust gas,
$\gamma_t$ is a second thermodynamic constant of the exhaust gas,
$\eta_t$ is an efficiency of the turbine that can be expressed by means of a function of the corrected speed setpoint relative to the turbine of the turbocharger and of the open-loop expansion ratio setpoint, said function being defined by a two-dimensional map,
$W_{t,sp}$ is a flowrate setpoint for the flowrate of exhaust gases through the turbine and determined by the formula:

$$W_{t,sp} = W_{t,sp,cor} \cdot \sqrt{\frac{T_{t,ref}}{T_{ut}}} \cdot \frac{P_{dt}}{P_{t,ref}},$$

where $W_{t,sp}$ is a flowrate setpoint for tree flowrate of exhaust gases through the turbine,
$W_{t,sp,cor}$ is a corrected flowrate setpoint for the flowrate of exhaust gases through the turbine that can be expressed by means of a function of the corrected speed setpoint relative to the turbine of the turbocharger and of the open-loop expansion ratio setpoint, said function being defined by a two-dimensional map,
$T_{ut}$ is a temperature upstream of the turbine,
$T_{t,ref}$ is a reference temperature of the turbine,
$P_{dt}$ is a pressure downstream of the turbine,
$P_{t,ref}$ is a reference pressure of the turbine.

According to another feature of the invention, the first controller module or, respectively, the second controller module, is a regulator configured to cancel said error.

According to another feature of the invention, the regulator uses fuzzy logic.

According to another feature of the invention, the regulator comprises a Proportional Integral Derivative (PID) module.

According to another feature of the invention, the bypass actuator for bypassing the turbine is modeled by a Saint Venant equation, using the formula:

$$W_{act} = S_{act} \frac{P_{dt}}{\sqrt{T_{dt}}} \cdot \psi(PR),$$

where
PR denotes the input parameter, namely, respectively:
  $PR_{t,sp}$ the expansion ratio setpoint,
  $PR_{t,sp,ol}$ the open-loop expansion ratio setpoint,
  $PR_{t,sp,ol,sat}$ the saturated open-loop expansion ratio setpoint,
$W_{act}$ is a flowrate through the actuator,
$S_{act}$ is a cross section of the actuator,
$P_{dt}$ is a pressure downstream of the turbine,
$T_{dt}$ is a temperature downstream of the turbine,
$\psi$ is a function of the variable X, defined by:

$$\psi(X) = \sqrt{\frac{2\gamma_t}{R(\gamma_t - 1)}} \sqrt{X^{\frac{-2}{\gamma_t}} - X^{\frac{-(\gamma_t-1)}{\gamma_t}}},$$

where
$\gamma_t$ is a first thermodynamic constant of the exhaust gas, equal to 1.4,
R is the universal gas constant, equal to 287 J/kg/K.

According to another feature of the invention, the flowrate through the actuator is determined using the formula:

$$W_{act} = W_{c,m} - W_{t,sp},$$

where
$W_{c,m}$ is a measurement of the flowrate through the compressor,
$W_{t,sp}$ is a flowrate setpoint for the flowrate through the turbine.

According to another feature of the invention, said cross section of the actuator is mapped as a function of the position setpoint for said actuator and of the expansion ratio setpoint.

The invention also relates to a method, for a fixed geometry double supercharging device for supercharging a combustion engine, comprising:

a high-pressure first turbocharger comprising a high-pressure turbine driven by the exhaust gases emanating from said combustion engine, a high-pressure compressor driven in rotation by the high-pressure turbine so as to compress the intake air injected into the combustion engine, and a high-pressure bypass actuator for bypassing the high-pressure turbine making it possible to command an air flowrate that does not pass through the high-pressure turbine,
 a low-pressure second turbocharger comprising a low-pressure turbine driven by the exhaust gases emanating from said combustion engine via the high-pressure turbine or the high-pressure bypass actuator, a low-pressure compressor driven in rotation by the low-pressure turbine so as to compress the intake air injected into the combustion engine via the high-pressure compressor, and a low-pressure bypass actuator for bypassing the low-pressure turbine making it possible to command an air flowrate that does not pass through the low-pressure turbine, and
 a bypass valve for the high-pressure compressor allowing the high-pressure compressor to be selectively bypassed so as to connect the low-pressure compressor directly to the engine, of determining a setpoint for commanding the high-pressure bypass actuator and a setpoint for commanding the low-pressure bypass actuator as a function of a high-pressure pressure ratio setpoint, of a low-pressure pressure ratio setpoint, of a high-pressure pressure ratio measurement, of a low-pressure pressure ratio measurement, of an air flowrate measurement for the flowrate of air through the high-pressure and low-pressure compressors, of the pressure measurements downstream of the high-pressure turbine and the low-pressure turbine respectively, of the pressure measurements downstream of the high-pressure compressor and the low-pressure compressor respectively, of the temperature measurements upstream of the high-pressure turbine and the low-pressure turbine respectively, and of the temperature measurements upstream of the high-pressure compressor and the low-pressure compressor respectively, said method comprising the following steps:

selecting, by means of a handler, which bypass actuator out of the high-pressure bypass actuator and the low-pressure bypass actuator to command, accordingly selecting a position setpoint for the high-pressure bypass actuator as a function of a high-pressure compression ratio setpoint and of a high-pressure compression ratio measurement, or determining a position setpoint for the low-pressure bypass actuator as a function of a low-pressure compression ratio setpoint and of a low-pressure compression ratio measurement, according to the method of any one of the preceding embodiments.

According to another feature of the invention, the selecting step is carried out by the handler in accordance with the following rules:

the high-pressure bypass actuator is operated when the speed of the engine is below a threshold, the bypass valve of the high-pressure compressor being forced closed and the low-pressure bypass actuator being forced closed, the low-pressure bypass actuator is operated when the speed of the engine is above a threshold, the bypass valve of the high-pressure compressor being forced open and the high-pressure bypass actuator being forced open.

According to another feature of the invention, the threshold speed for the engine is equal to 2750 rpm.

BRIEF DESCRIPTION OF THE DRAWINGS

Other features, details and advantages of the invention will become more clearly apparent from the detailed description given hereinafter by way of indication, in conjunction with the drawings in which.

DETAILED DESCRIPTION OF THE INVENTION

In order to make the description, the block diagrams and particularly the formulae, easier to understand, this is the notation used:

Variables:
N: rotational speed (of the turbocharger),
PR: pressure ratio (compression ratio in the case of a compressor, expansion ratio in the case of a turbine),
W: flowrate,
P: pressure,
H: power,
T: temperature,
η: efficiency,
RM: engine speed,
Cp: thermodynamic constant, the specific heat capacity at constant pressure,
Cv: thermodynamic constant, the specific heat capacity at constant volume,
γ: thermodynamic constant, a coefficient equal to Cp/Cv,
J: moment of inertia or second moment of area (of the turbocharger).

Suffixes:
c: compressor,
t: turbine,
sp: setpoint,
m: measured, observed, or simulated,
cor: corrected,
cort: corrected relative to the turbine,
corc: corrected relative to the compressor,
ref: reference,
u: upstream,
d: downstream,
ol: open loop,
cl: closed loop,
sat: saturated,
HP: high pressure,
BP: low pressure.

Figure 1:
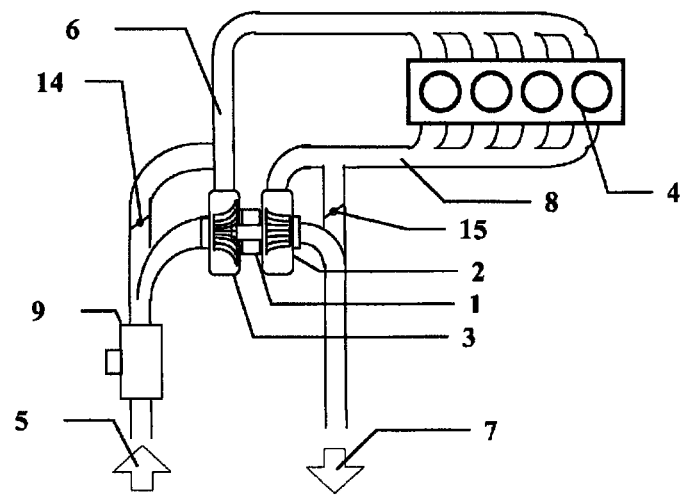
FIG. 1 illustrates a combustion engine with a supercharging turbocharger.

FIG. 1 illustrates the context of the invention in the case of a single turbocharger 1. A combustion engine 4 conventionally receives air 5 via intake tracts 6. The engine 4 produces exhaust gases 7 which escape via exhaust tracts 8. A supercharging turbocharger 1 makes it possible to increase the quantity of air 5 admitted by the combustion engine 4. To do that, the turbocharger 1 comprises a turbine 2 and a compressor 3. The turbine 2 is fluidically connected to the exhaust tracts 8 so as to be driven by the exhaust gases 7 emanating from the combustion engine 4. The turbine 2 is mechanically connected to the compressor 3 the rotation of which it drives. The compressor 3 is fluidically connected to the intake tracts 6, so that the compressor 3 compresses the intake air 5 before it enters the combustion engine 4. It is possible to isolate the turbine 2 using a bypass actuator 15. It is possible to isolate the compressor using a bypass valve 14. The reference 9 embodies a sensor that measures the flowrate $W_{c,m}$ of the intake air 5.

Figure 2:
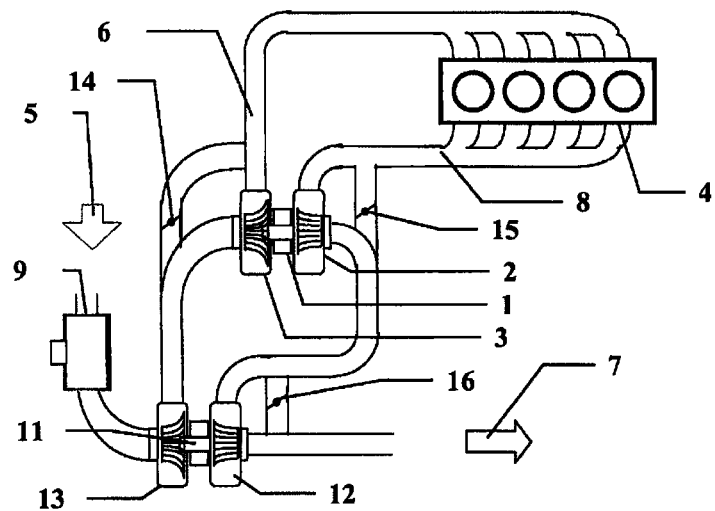
FIG. 2 illustrates a combustion engine equipped with a supercharging device comprising two turbochargers.

FIG. 2 illustrates the context of the invention in the case of a double turbocharger 1, 11. A high-pressure first turbocharger 1 is identical to the turbocharger previously described, with a high-pressure turbine 2, a high-pressure compressor 3 and a proportionally controlled high-pressure bypass actuator 15 makes it possible to set a flowrate that does not pass through the high-pressure turbine 2. A low-pressure second turbocharger 11 is connected in series with the first turbocharger 1. The low-pressure turbine 12 is driven by the exhaust gas 7 leaving the downstream side of the high-pressure turbine 2 or, when it is at least partially forced open, of the high-pressure bypass actuator 15. On the outlet side of the low-pressure turbine 12, the exhaust gas 7 is directed toward the exhaust. The low-pressure turbine 12 is mechanically connected to the low-pressure compressor 13 the rotation of which it drives. The low-pressure compressor receives the air from the air filter and compresses it before passing it on to the upstream side of the high-pressure compressor 3. If the open/closed bypass valve 14 is open, the low-pressure compressor 13 passes the air directly onto the engine 4 via the intake tract 6.

The two, high-pressure 15 and low-pressure 16, bypass actuators which are proportionally controllable, are located between the upstream and downstream sides of the high-pressure turbine 2 and the low-pressure turbine 12, respectively. Likewise, the open/closed compressor bypass valve 14 is located between the upstream and downstream sides of the high-pressure compressor 3. These three devices provide control over the entire supercharging system 20.

Whereas the double-loop control of the prior art operates both bypass actuators 15, 16 simultaneously, the desired elimination of an exhaust pressure $P_{ut,HP}$ sensor upstream of the high-pressure turbine 2 does not allow such means of control.

One of the principles of the invention is for just one turbocharger 1, 11 to be operated at a time, by action on the corresponding bypass actuator 15, 16.

According to the invention, the central module of the method comprises a step of determining a position setpoint $\alpha_{sp}$ for a bypass actuator 15, 16 as a function of a compression ratio setpoint $PR_{c,sp}$ and of a compression ratio measurement $PR_{c,m}$. Two pressure ratios PR can be defined as being the ratio of the upstream pressure $P_u$ to the downstream pressure $P_d$. For a compressor 3, 13, this pressure ratio is known as the compression ratio PR, and is equal to $$PR_c = \frac{P_{uc}}{P_{dc}}.$$

For a turbine 2, 12, this pressure ratio is known as the expansion ratio $PR_t$ and is equal to $$PR_t = \frac{P_{ut}}{P_{dt}}.$$

The central module accepts as input a compression ratio setpoint $PR_{c,sp}$ on the basis of which parameters are determined in open loop. In order to refine the method, closed-loop parameters are also determined. To do that, the method is looped back on a parameter indicative of the response of the system 20. This measured parameter may be a compression ratio measurement $PR_{c,m}$ or, and the two are equivalent, a difference in said compression ratio $\epsilon_{PRc}$, calculated as $\epsilon_{PRc} = PR_{c,sp} - PR_{c,m}$.

Figure 3:
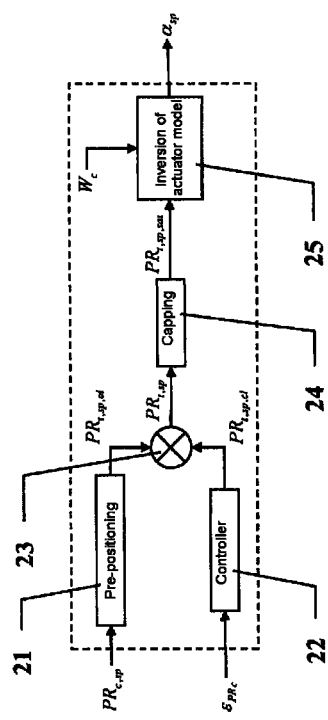
FIG. 3 is a block diagram of a "series" embodiment of the method according to the invention.
Figure 4:
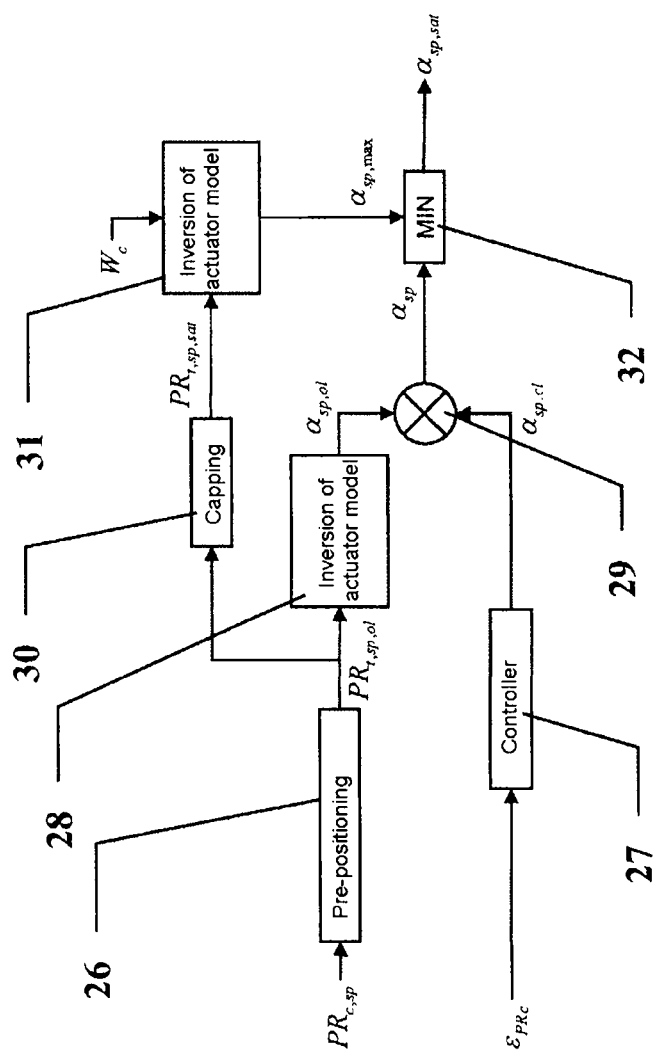
FIG. 4 is a block diagram of a "parallel" embodiment of the method according to the invention.

This central module can be operated in various modes of embodiment. Two illustrative modes of embodiment are given here. These two modes use identical or similar modules organized differently. A first "series" mode of embodiment is illustrated in FIG. 3. A second "parallel" mode of embodiment is illustrated in FIG. 4.

With reference to FIG. 3, in the series mode, the determining of a position setpoint $\alpha_{sp}$ for the bypass actuator 15, 16 can be broken down into a first step of determining, by the units 21, 22, 23, an expansion ratio setpoint $PR_{t,sp}$ as a function of the compression ratio setpoint $PR_{c,sp}$ and of the compression ratio measurement $PR_{c,m}$, or of the difference $\epsilon_{PRc}$, which were available at input, followed by a second step of determining a position setpoint $\alpha_{sp}$ for the bypass actuator 15, 16 as a function of the expansion ratio setpoint $PR_{t,sp}$ thus determined, within the unit 25 and, as appropriate, the unit 24. The determining of the position setpoint $\alpha_{sp}$ for the bypass actuator 15, 16 as a function of the expansion ratio setpoint $PR_{t,sp}$ uses an inverse actuator model, situated in the unit 25. This inverse actuator model, which is reused on numerous occasions, will be described in greater detail later on.

Within the limitation unit 24, the expansion ratio setpoint $PR_{t,sp}$ is advantageously saturated prior to application of the inverse actuator model 25. This saturation is advantageously carried out by capping said expansion ratio $PR_{t,sp}$ at a maximum expansion ratio $PR_{t,sp,max}$, calculated as a function of a maximum authorized pressure $P_{dt,max}$ downstream of the turbine 2, 12, using the formula:

$$PR_{t,sp,sat} = \min\left(PR_{t,sp}, \frac{P_{dt,max}}{P_{dt}}\right)$$

Following capping, the expansion ratio $PR_{t,sp}$ is replaced throughout by the saturated expansion ratio $PR_{t,sp,sat}$.

The intermediate expansion ratio setpoint $PR_{t,sp}$ is determined by using the summer 23 to sum an open-loop expansion ratio setpoint $PR_{t,sp,ol}$ with a closed-loop expansion ratio setpoint $PR_{t,sp,cl}$.

The open-loop expansion ratio setpoint $PR_{t,sp,ol}$ is calculated as a function of the compression ratio setpoint $PR_{c,sp}$ by a module that models the system 20. This module, known as the prepositioning module, installed in unit 21, and reused on a number of occasions, will be described in greater detail later on.

The closed-loop expansion ratio setpoint $PR_{t,sp,cl}$ uses a looping back on measured or estimated parameters emanating from the system 20 in order to provide feedback control of the method. It is calculated as a function of an error or difference $\epsilon_{pRc}$ between the compression ratio setpoint $PR_{c,sp}$ and the compression ratio measurement $PR_{c,m}$ actually taken. The calculation is carried out by a first controller module 22. This controller module, installed in a first unit, and reused on a number of occasions, will be described in greater detail later on.

With reference to FIG. 4, in the parallel mode, the position setpoint $\alpha_{sp}$ for the bypass actuator 15, 16 is determined by the summer 29 to sum an open-loop position setpoint $\alpha_{sp,ol}$ with a closed-loop position setpoint $\alpha_{sp,cl}$.

The closed-loop position setpoint $\alpha_{sp,cl}$ uses a looping back on measured or estimated parameters emanating from the system 20 so as to provide feedback control of the method. It is calculated as a function of the error $\epsilon_{pRc}$ between the compression ratio setpoint $PR_{c,sp}$ and the compression ratio measurement $PR_{c,m}$ by a second controller module 27. This controller module, installed in a second unit, is very similar to the one used in the series mode.

The open-loop position setpoint $\alpha_{sp,ol}$ is calculated as a function of the compression ratio setpoint $PR_{c,sp}$ by a module that models the system 20. This module comprises, in sequence, a prepositioning module 26, installed in unit 26 and identical to the prepositioning module 21 of the series mode, and an inverse actuator model, installed in unit 28 and identical to the inverse actuator model 25 of the series mode. The determining of the open-loop position setpoint $\alpha_{sp,ol}$, comprises the successive steps of determining an open-loop expansion ratio setpoint $PR_{t,sp,ol}$ as a function of the compression ratio setpoint $PR_{c,sp}$ by the prepositioning module and the determining of an open-loop position setpoint $\alpha_{sp,ol}$ as a function of the open-loop expansion ratio setpoint $PR_{t,sp,ol}$ thus determined using an inverse actuator model installed in unit 28.

The saturation, which is optional, performed on the expansion ratio parameter $PR_{t,sp}$ within unit 24 of the series mode, is performed here on the position parameter $\alpha_{sp}$ for the bypass actuator 15, 16 within unit 32, the predominant maximum position setpoint parameter $\alpha_{sp,max}$, corresponding to the same acceptable maximum pressure $P_{dt,max}$ in the exhaust tract downstream of the turbine 2, 12. This saturation is performed according to the formula:

$$\alpha_{sp,sat} = \min(\alpha_{sp}, \alpha_{sp,max})$$

where $\alpha_{sp,sat}$ is a position setpoint after saturation, $\alpha_{sp}$ is the position setpoint before saturation and $\alpha_{sp,max}$ is a maximum position setpoint.

The maximum position setpoint $\alpha_{sp,max}$ is determined as a function of the open-loop expansion ratio $PR_{t,sp,ol}$ using an inverse actuator model installed in unit 31. This inverse actuator model is the same as the one installed in unit 28 and in unit 25 of the series mode.

Advantageously, the open-loop expansion ratio setpoint $PR_{t,sp,ol}$ is, prior to application of the inverse actuator model 31 to determine the maximum position setpoint $\alpha_{sp,max}$, saturated in unit 30 as a function of the maximum authorized pressure $P_{dt,max}$ downstream of the turbine 2, 12.

Certain modules which are common to the series and parallel modes, namely the prepositioning module, the controller and the inverse actuator model, will now be described in greater detail.

The prepositioning module, installed in units 21 and 26, determines an expansion ratio setpoint on the basis of the compression ratio setpoint. It relies on an assumption that the powers of the compressor and of the turbine are equal in the steady state. It can be broken down into four steps.

Step 1: Calculating a Turbocharger Speed Setpoint

A speed setpoint is calculated on the basis of a function f1, given in the form of a compressor map f1, supplied by the manufacturer as a function of parameters that have been reduced or corrected for pressure and for temperature in relation to reference values. This map is given in FIGS. 6 to 9. It gives the compression ratio $PR_c$ on the compressor impeller 3, 13 as a function of the corrected flowrate $W_{c,m,cor}$ and of the corrected speed $N_{sp,corc}$ relative to the compressor. Because the speed N is defined the same for the turbine 2, 12 or the compressor 3, 13 it can be corrected $N_{sp,cort}$ relative to the temperature $T_{ut}$ of the turbine 2, 12 or alternatively corrected $N_{sp,corc}$ relative to the temperature $T_{uc}$ of the compressor 3, 13.

This gives:

$$PR_{c,sp} = f_1(W_{c,m,cor}, N_{sp,corc}), \text{ with}$$

$$N_{sp,corc} = N_{sp} \cdot \sqrt{\frac{T_{c,ref}}{T_{uc}}}, \text{ and } W_{c,m,cor} = W_{c,m} \cdot \sqrt{\frac{T_{uc}}{T_{c,ref}}} \frac{P_{c,ref}}{P_{dc}}.$$

The flowrate $W_{c,m,cor}$ of the intake air 5 is obtained from the previous formula as a function of the air flowrate $W_{c,m,cor}$. This flowrate $W_{c,m,cor}$ is, for example, measured by a flowmeter 9. It is assumed that the flowrate through the low-pressure compressor 13 is the same as the flowrate through the high-pressure compressor 3.

The turbocharger speed setpoint $N_{sp}$ is thus obtained as a function of the compression ratio setpoint $PR_{c,sp}$ and of the flowrate $W_{c,m}$ by inversion of the function f1.

Step 2: Calculating the Compressor Power Setpoint

The power $H_c$ of the compressor 3, 13 is expressed analytically by applying the fundamental principle of thermodynamics to the impeller of the compressor 3, 13. This results in an expression showing the pressure conditions at the extremes of the compressor 3, 13, the flowrate $W_{c,m}$ passing through it and the temperature $T_{uc}$ upstream:

$$H_{c,sp} = W_{c,m} \cdot Cp_c \cdot \frac{1}{\eta_c} \cdot T_{uc} \left[ (PR_{c,sp})^{\frac{\gamma_c - 1}{\gamma_c}} - 1 \right]$$

The efficiency $\eta_c$ in the above expression is connected to the speed $N_{sp}$ and to the flowrate $W_{c,m}$. This relationship is given by a function f2, established by the manufacturer, for example in the form of a map f2. Such a map is given in FIGS. 10 to 13.

$$\eta_c = f_2 \left( W_{c,m} \cdot \frac{P_{c,ref}}{P_{uc}} \sqrt{\frac{T_{uc}}{T_{c,ref}}}, N_p \cdot \sqrt{\frac{T_{c,ref}}{T_{uc}}} \right)$$

At this stage, the pressure ratio setpoint $PR_{c,sp}$, the flowrate measurement $W_{c,m}$ and the speed setpoint $N_{sp}$ are known. It is thus possible to calculate the compressor power setpoint $H_{c,sp}$. This power $H_{c,sp}$ consumed by the compressor 3, 13 corresponds to the power that has to be recuperated by the turbine 2, 12 and passed on to said compressor 3, 13 in order to achieve the desired boost pressure $P_{dt,HP}$ in the intake manifold 6.

Step 3: Calculating the Turbine Power

Step 3 converts the compressor power setpoint $H_{c,sp}$ into a turbine power setpoint $H_{t,sp}$. The rotational speed N of the turbocharger 1, 11 is obtained by the fundamental principle of dynamics applied to the system made up of the turbine 2, 12, of the compressor 3, 13 and of the shaft coupling turbine and compressor together. This relationship allows the "intake" setpoints (on the compressor) to be transferred to "exhaust" setpoints (on the turbine). The speed N of the turbocharger 1, 11 is essentially dependent on the difference between the power $H_t$ of the turbine 2, 12 and the power $H_c$ of the compressor 3, 13. These powers can be expressed analytically by applying the first principle of thermodynamics. In the equation below, the powers are replaced by their setpoint values:

$$JN \frac{dN}{dt} = H_{t,sp} - H_{c,sp}$$

where J is the inertia or second moment of area and d/dt is the operator of differentiating with respect to time.

It is assumed that the system is in equilibrium. This means that the dynamic term can be neglected. Based on this assumption, all of the turbine power is passed on to the compressor:

$$H_{t,sp} = H_{c,sp}$$

Step 4: Calculating the Open-Loop Expansion Ratio Setpoint

The turbine power $H_{t,sp}$ is known and explicitly dependent on the expansion ratio $PR_{t,sp}$, using the following formula:

$$H_{t,sp} = W_{t,sp} \cdot Cp_t \cdot \eta_t \cdot T_{ut} \left[ 1 - \left( \frac{1}{PR_{t,sp,ol}} \right)^{\frac{\gamma_t - 1}{\gamma_t}} \right], \text{ with}$$

-continued $$\begin{cases} \eta_t = f_3\left(PR_{t,sp,ol}, N_{sp} \cdot \sqrt{\dfrac{T_{t,ref}}{T_{ut}}}\right) \\ W_{t,sp} \cdot \sqrt{\dfrac{T_{ut}}{T_{t,ref}}} \cdot \dfrac{P_{t,ref}}{P_{dt}} = f_4\left(PR_{t,sp,ol}, N_{sp} \cdot \sqrt{\dfrac{T_{t,ref}}{T_{ut}}}\right) \end{cases}$$

This formula can be written as a function of the expansion ratio setpoint $PR_{t,sp}$ and undergo inversion to calculate a turbine expansion ratio setpoint $PR_{t,sp}$.

In the turbine power expression below, the flowrate $W_{t,sp}$ and the efficiency $\eta_t$ are given by functions f3 and f4 supplied in the form of maps established by the manufacturer of the turbocharger 1, 11. They are dependent on the turbine speed N and on the expansion ratio $PR_t$. The equation expressing equality of the power setpoints can be rewritten replacing the turbine power setpoint $H_{t,sp}$ by its expression:

$$H_{c,sp} = W_{t,sp} \cdot Cp_t \cdot \eta_t \cdot T_{ut}\left[1 - \left(\dfrac{1}{PR_{t,sp,ol}}\right)^{\frac{\gamma_t-1}{\gamma_t}}\right]$$

Next, if the flowrate and the efficiency are replaced by their respective expressions, we get:

$$H_{c,sp} = Cp_t \cdot T_{ut} \cdot f_3(PR_{t,sp,ol}, N_{sp,corr}) \cdot$$

$$f_4(PR_{t,sp,ol}, N_{sp,corr}) \cdot \dfrac{P_{dt}}{P_{t,ref}} \cdot \sqrt{\dfrac{T_{t,ref}}{T_{ut}}} \cdot \left[1 - \left(\dfrac{1}{PR_{t,sp,ol}}\right)^{\frac{\gamma_t-1}{\gamma_t}}\right]$$

Finally, the above relationship can undergo inversion in order to calculate the expansion ratio setpoint $PR_{t,sp,ol}$ needed in order to obtain the desired compressor power $H_{c,sp}$ and this will, in turn, make it possible to obtain the compression ratio setpoint $PR_{c,sp}$ and therefore the desired boost pressure $P_{dt,sp}$.

$$PR_{t,sp,ol} = F^{-1}\left(\dfrac{H_{c,sp}}{C_p \cdot T_{ut} \cdot \dfrac{P_{dt}}{P_{t,ref}} \cdot \sqrt{\dfrac{T_{t,ref}}{T_{ut}}}}, N_{sp} \cdot \sqrt{\dfrac{T_{t,ref}}{T_{ut}}}\right)$$

The map $F^{-1}$ incorporates the maps f3 and f4.

An example of such a map $F^{-1}$ is illustrated in FIGS. 14 to 17.

The parameters used in the above formulae are input setpoint parameters or are determined by the above formulae. They may even be constants. Thus, the thermodynamic constants:

$Cp_t$, the specific heat capacity of the exhaust gas 7 at constant pressure is equal to 1136 J/kg/K, $\gamma_t$, the coefficient that is the ratio $Cp_t/Cv_t$ of the specific heat capacities of the exhaust gas 7 at constant pressure and at constant volume respectively, is equal to 1.34, $Cp_c$, the specific heat capacity of the intake air 5 at constant pressure is equal to 1005 J/kg/K, $\gamma_c$, the coefficient of the ratio $Cp_c/Cv_c$ of the specific heat capacities of the intake air 5 at constant pressure and at constant volume respectively, is equal to 1.4.

As far as the other parameters are concerned:

$P_{dt,max}$ is a constant determined by tract strength calculations, $W_{c,m}$ is determined by the flowmeter 9, bearing in mind the conservation of mass, and the assumption that $W_{c,m,HP}$ is equal to $W_{c,m,BP}$.

$P_{dt}$, $P_{dc}$, $T_{uc}$, $T_{ut}$ are determined by sensors, estimators, or using any other method known to those skilled in the art. Thus, the temperature $T_{ut}$ upstream of the turbine may be known from a map as a function of engine speed RM and engine 4 load.

The reference temperatures and pressures used to determine the corrected reduced parameters are, in the illustrative examples provided, equal to:

$T_{c,ref}$=298 K, $T_{t,ref}$=873 K, $P_{c,ref}$=$P_{t,ref}$=1 atm.

This is true both of the high-pressure turbocharger 1 and of the low-pressure turbocharger 11.

The controller is another module that is reused in the various modes of embodiment. A first controller module 22 is used by the series mode, and a second controller module 27 is used by the parallel mode. The function of such a regulator is, as is known, to modify an output parameter, in this instance $PR_{t,sp}$ or $\alpha_{sp}$, in order to cancel the difference $\epsilon_{PRc}$ measured at input. A person skilled in the art knows various methods for performing such a function. Mention may also be made of the scenario in which the controller is a regulator 22, 27 using rules of fuzzy logic. Again conventionally, the regulator 22, 27 may comprise a Proportional Integral Derivative, or PID, module.

Another module that is reused in the various modes of embodiment is a module that models a bypass actuator 15, 16. Such an actuator, positioned in a tract, is controllable proportionately by a setpoint $\alpha_{sp}$ so as to modify the cross-sectional area $S_{act}$ of its opening between 0 and 100%. Such modeling is, for example, achieved using a Saint Venant equation, using the formula:

$$W_{act} = S_{act}\dfrac{P_{dt}}{\sqrt{T_{dt}}} \cdot \psi(PR),$$

where
PR denotes the input parameter, namely, respectively:
$PR_{t,sp}$ the expansion ratio setpoint,
$PR_{t,sp,ol}$ the open-loop expansion ratio setpoint,
$PR_{t,sp,ol,sat}$ the saturated open-loop expansion ratio setpoint,
$W_{act}$ is a flowrate through the actuator 15, 16,
$S_{act}$ is a cross section of the actuator 15, 16,
$P_{dt}$ is a pressure measurement downstream of the turbine,
$T_{dt}$ is a temperature measurement downstream of the turbine,
$\Psi$ is a function of the variable X, defined by:

$$\psi(X) = \sqrt{\dfrac{2\gamma_t}{R(\gamma_t - 1)}}\sqrt{X^{\frac{-2}{\gamma_t}} - X^{\frac{-(\gamma_t-1)}{\gamma_t}}},$$

where
$\gamma_t$ is a first thermodynamic constant of the exhaust gas (7), equal to 1.4,
R is the universal gas constant, equal to 287 J/kg/K.

In the above formula, the flowrate $W_{act}$ through the actuator 15, 16 can be determined, because of the conservation of mass, using the formula:

$$W_{act} = W_{c,m} - W_{t,sp},$$

where $W_{c,m}$ is a measured flowrate through the compressor 3, 13,
$W_{t,sp}$ is a flowrate setpoint for the flowrate through the turbine 2, 12.

Advantageously, in order to be able more quickly to determine a value for the cross section $S_{act}$ of the actuator 15, 16, said cross section can be mapped as a function of the position setpoint $\alpha_{sp}$ for said actuator 15, 16 and of the expansion ratio setpoint $PR_{t,sp}$.

The description up to this point has been concerned with a method for operating one turbocharger 1, 11. In the event that there is a double turbocharger, as illustrated in FIG. 2, comprising a high-pressure first turbocharger 1 comprising a high-pressure turbine 2 driven by the exhaust gases 7 emanating from the combustion engine 4, a high-pressure compressor 3 driven in rotation by the high-pressure turbine so as to compress the intake air 5 injected into the combustion engine 4, and a high-pressure bypass actuator 15 for bypassing the high-pressure turbine 2 making it possible to command an air flowrate $W_{act,HP}$ that does not pass through the high-pressure turbine 2, a low-pressure second turbocharger 11 comprising a low-pressure turbine 12 driven by the exhaust gases 7 emanating from said combustion engine 4 via the high-pressure turbine 2 or the high-pressure bypass actuator 15, a low-pressure compressor 13 driven in rotation by the low-pressure turbine 12 so as to compress the intake air 5 injected into the combustion engine 4 via the high-pressure compressor 3, and a low-pressure bypass actuator 16 for bypassing the low-pressure turbine 12 making it possible to command an air flowrate $W_{act,BP}$ that does not pass through the low-pressure turbine 12, and a bypass valve 14 for the high-pressure compressor 3 allowing the high-pressure compressor 3 to be selectively bypassed so as to connect the low-pressure compressor 13 directly to the engine 4, a method may be used for controlling each of the two turbochargers 1, 11 turned by turnabout. Such a method determines a setpoint $\alpha_{sp,BP}$ for commanding the high-pressure bypass actuator 15 and/or a setpoint $\alpha_{sp,BP}$ for commanding the low-pressure bypass actuator 16 as a function of a high-pressure pressure ratio setpoint $PR_{c,sp,HP}$, of a low-pressure pressure ratio setpoint $PR_{c,sp,BP}$, of an air flowrate $W_{c,m}$ of air through the compressor, of a temperature $T_{uc}$ upstream of the compressor 3, 13, of a temperature $T_{ut}$ upstream of the turbine 2, 12.

Figure 5:
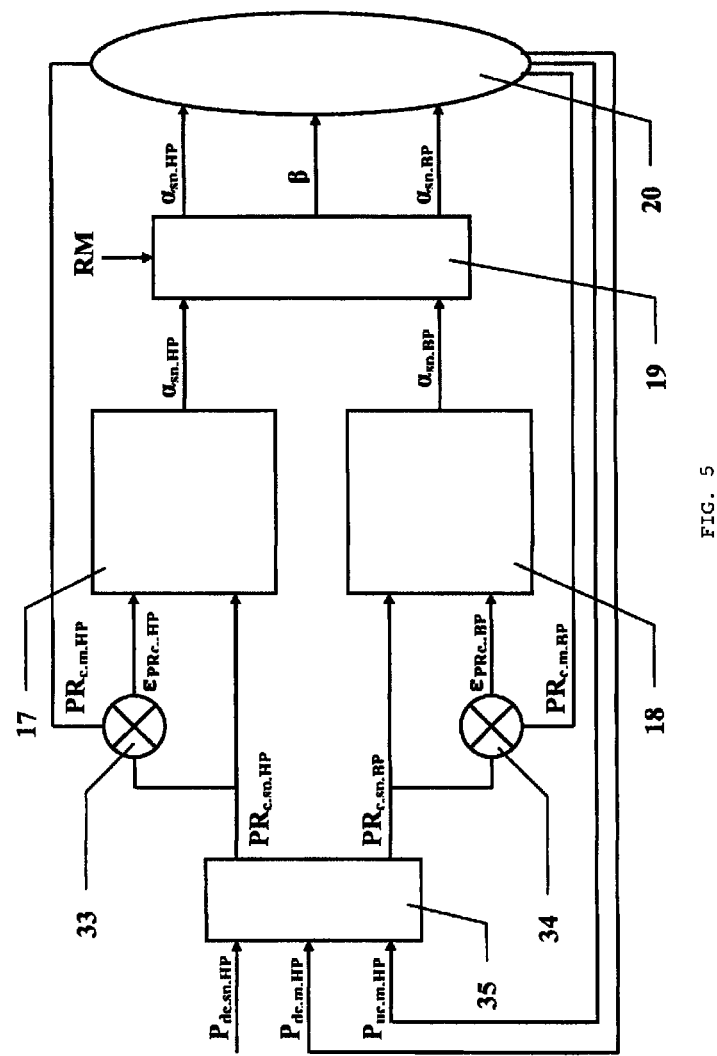
FIG. 5 is a block diagram incorporating two series or parallel modules, FIGS. 6 and 7 respectively are a map and a table of numerical values defining the function f1 for the high-pressure turbocharger, FIGS. 8 and 9 respectively are a map and a table of numerical values defining the function f1 for the low-pressure turbocharger, FIGS. 10 and 11 respectively are a map and a table of numerical values defining the function f2 for the high-pressure turbocharger, FIGS. 12 and 13 respectively are a map and a table of numerical values defining the function f2 for the low-pressure turbocharger, FIGS. 14 and 15 respectively are a map and a table of numerical values defining the function $F^{-1}$ for the high-pressure turbocharger, FIGS. 16 and 17 respectively are a map and a table of numerical values defining the function $F^{-1}$ for the low-pressure turbocharger.
Figures 6, 7:
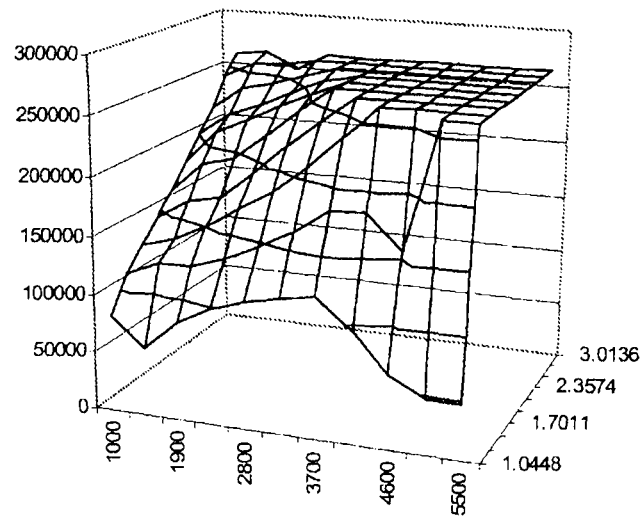
Figures 8, 9:
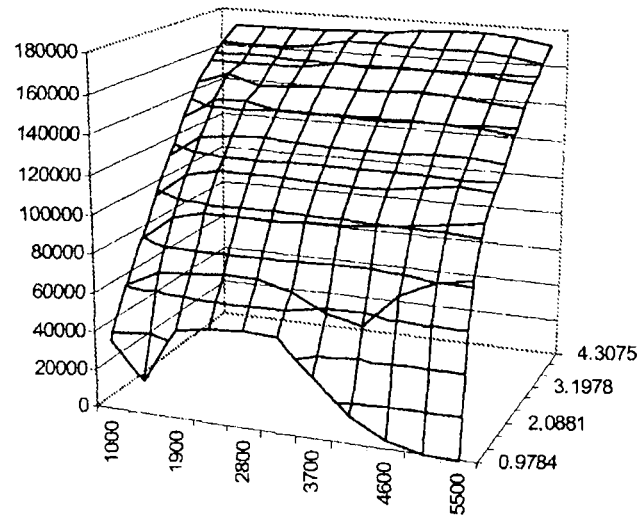
Figures 10, 11:
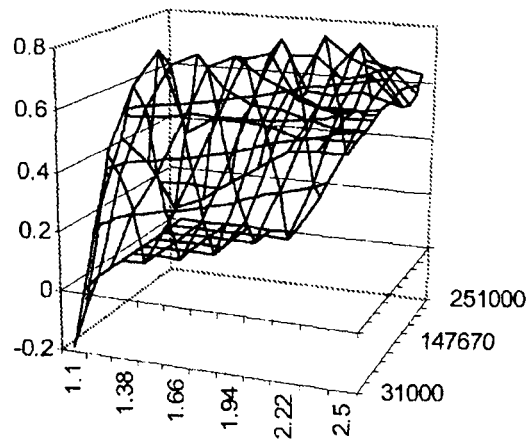
Figures 12, 13:
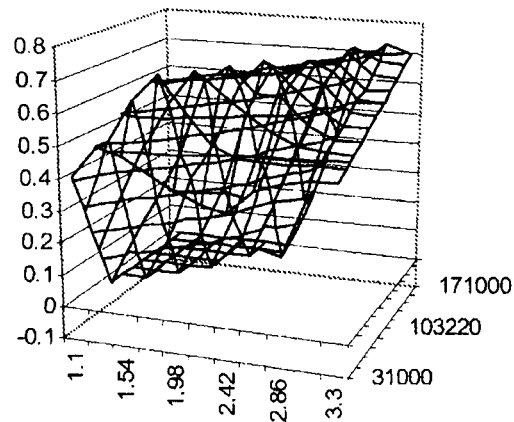
Figures 14, 15:
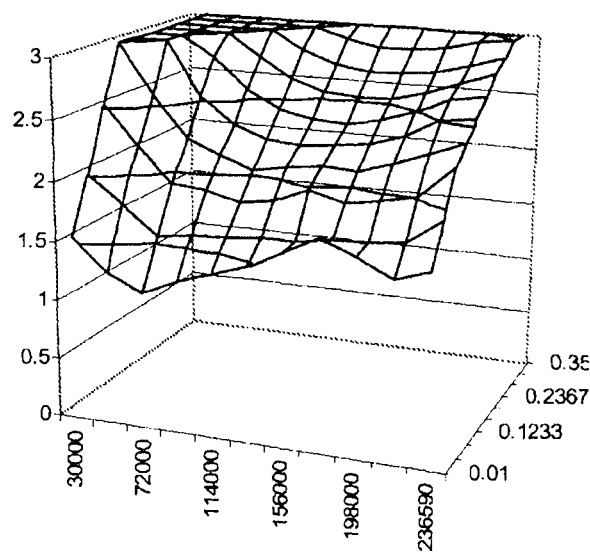
Figures 16, 17:
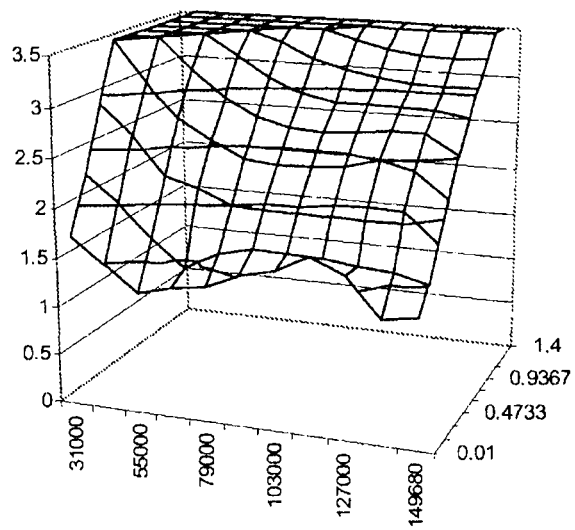

One mode of embodiment of such a method is illustrated in FIG. 5. A handler 19 arbitrates between two independent loops each dedicated to the control of one of the turbochargers 1, 11 through its bypass actuator, the high-pressure bypass actuator 15 and the low-pressure bypass actuator 16, respectively. Just one of the two turbochargers 1, 11, the which one being determined by the handler 19, is operated at any one time. The handler 19 thus determines the necessary inputs and either the position setpoint $\alpha_{sp,BP}$ for the high-pressure bypass actuator 15 as a function of a high-pressure compression ratio setpoint $PR_{c,sp,HP}$ and of a high-pressure compression ratio measurement $PR_{C,m,HP}$ if it is the high-pressure turbocharger 1 that is being operated, or the position setpoint $\alpha_{sp,BP}$ of the low-pressure bypass actuator 16 as a function of a low-pressure compression ratio setpoint $PR_{c,sp,BP}$ and of a low-pressure compression ratio measurement $PR_{c,m,BP}$ if the low-pressure turbocharger 11 is being operated. Each of these two position setpoints $\alpha_{sp,HP}$, $\alpha_{sp,BP}$, is determined according to one of the modes of embodiment of the method described above.

Thus, the handler 19 determines which out of the high-pressure 1 or low-pressure 11 turbochargers is being operated. As the case may be, it receives either a high-pressure position setpoint $\alpha_{sp,HP}$ determined by a high-pressure module 17 or a low-pressure position setpoint $\alpha_{sp,BP}$ determined by a low-pressure module 18.

When it is the high-pressure turbocharger 1 that is being operated, the handler 19 operates the high-pressure actuator 15 using the setpoint $\alpha_{sp,HP}$, forces the low-pressure actuator 16 into the closed position using an $\alpha_{sp,BP}$ command at 0%, and forces the high-pressure valve 14 into the closed position using a command β.

When it is the low-pressure turbocharger 11 that is being operated, the handler 19 operates the low-pressure actuator using the setpoint $\alpha_{sp,BP}$, forces the high-pressure actuator 15 into the open position using an $\alpha_{sp,HP}$ command at 100%, and forces the high-pressure valve 14 into the open position using a command β.

The setpoint or measurement input parameters $PR_{c,sp,HP}$, $PR_{c,m,HP}$, $PR_{c,sp,BP}$ and $PR_{c,m,BP}$ are possibly shaped using an input unit 35 on the basis of more elementary parameters such as pressures. Thus, the main setpoint is a boost pressure or pressure $P_{dc,sp,HP}$ downstream of the high-pressure compressor 3. The measurement of this same parameter $P_{dc,HP}$, also denoted $P_{dc,HP}$, is also available measured or estimated from the controlled system 20. The pressure measurement $P_{uc,m,HP}$, also denoted $P_{uc,HP}$ upstream of the high-pressure compressor 3, is also available by measurement or estimation. This means that the input parameters for the high-pressure module 17 can be calculated:

$$PR_{c,sp,HP} = \frac{P_{uc,m,HP}}{P_{dc,sp,HP}}, \quad PR_{c,m,HP} = \frac{P_{uc,m,HP}}{P_{dc,m,HP}} \text{ and}$$

$\varepsilon_{PRc,HP} = PR_{c,sp,HP} - PR_{c,m,HP}$ via the summer 33.

The other useful parameters $W_{c,m,HP}$, $P_{dt,HP}$, $P_{dc,HP}$, $T_{ut,HP}$, $T_{uc,HP}$ are obtained by a sensor, an estimator or a map.

For the low-pressure module, it is necessary to know $P_{dc,sp,BP}$, $P_{dc,m,BP}$, and $P_{uc,m,BP}$. When it is the low-pressure turbocharger 11 that is being operated, the compressor bypass valve 14 is open. The low-pressure downstream pressure $P_{dc,sp,BP}$ is then equal to the boost pressure or to the high-pressure downstream pressure $P_{dc,sp,HP}$, which is known. Likewise, for measuring this parameter $P_{dc,m,BP}=P_{dc,m,HP}$. The low-pressure upstream pressure $P_{uc,m,BP}$ is equal to the air intake pressure 5, namely to atmospheric pressure $P_{atm}$ equal to 1 atm. This means that the input parameters for the low-pressure module 18 can be calculated:

$$PR_{c,sp,BP} = \frac{P_{uc,m,BP}}{P_{dc,sp,BP}} = \frac{P_{atm}}{P_{dc,sp,HP}}, \quad PR_{c,m,BP} = \frac{P_{uc,m,BP}}{P_{dc,m,HP}} \text{ and}$$

$\varepsilon_{PRc,BP} = PR_{c,sp,BP} - PR_{c,m,BP}$ via the summer 34.

The other useful parameters $W_{c,m,BP}$, $P_{dt,BP}$, $P_{dc,BP}$, $T_{ut,BP}$, $T_{uc,BP}$ are obtained from a sensor, an estimator or a map.

The step of selecting the turbocharger 1, 11 is performed by the handler 19 in accordance with the following rules:
  the high-pressure turbocharger 1 is operated via the high-pressure bypass actuator 15 when the speed RM of the engine 4 is below a threshold, the bypass valve 14 for bypassing the high-pressure compressor 3 being forced closed and the low-pressure bypass actuator 16 being forced closed,
  the low-pressure turbocompressor 11 is operated via the low-pressure bypass actuator 16 when the speed of the engine 4 is above a threshold, the bypass valve 14 for bypassing the high-pressure compressor 3 being forced open and the high-pressure bypass actuator 15 being forced open.

The threshold for the speed of the engine 4 is, for example, taken equal to 2750 rpm.

A more elaborate strategy for switching between high pressure and low pressure, for example taking engine load into consideration, could alternatively be used. Hysteresis could advantageously be introduced in order to avoid excessively frequent switchings around the engine speed threshold.

Figures 18, 19:
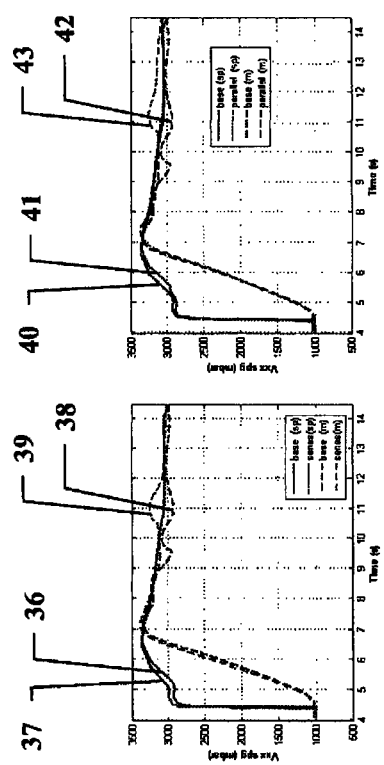
FIGS. 18 and 19 illustrate the results obtained with the series module and with the parallel module, respectively.

The results obtained with the method according to the invention are illustrated in the curves of FIGS. 18 and 19. All the curves plot boost pressure as a function of time during a transient, here the takeup of load in a gear ratio three. The reference/base line corresponds to the two-loop method of the prior art. Curve 36 shows the boost pressure setpoint $P_{dc,sp,HP}$ for the reference. Curve 37 shows the boost pressure setpoint $P_{dc,sp,HP}$ for the series mode. Curve 38 shows the boost pressure measurement $P_{dC,m,HP}$ for the reference. Curve 39 shows the boost pressure measurement $P_{dc,m,HP}$ for the series mode. Curve 40 shows the boost pressure setpoint $P_{dc,sp,HP}$ for the reference. Curve 41 shows the boost pressure setpoint $P_{dc,sp,HP}$ for the parallel mode. Curve 42 shows the boost pressure measurement $P_{dc,m,HP}$ for the reference. Curve 43 shows the boost pressure measurement $P_{dc,m,HP}$ for the parallel mode.

The method described shows that a two-stage supercharging system can be regulated without taking the pressure in the exhaust manifold 8 of the engine 4 into consideration. The "single loop" series and parallel structures have very similar performance to one another. In addition, the "single loop" structures make it possible to obtain response times which are almost identical to those obtained with the reference "double loop" method.

The invention claimed is:

1. A method, for a turbocharger for supercharging a combustion engine including a turbine driven by exhaust gases, a compressor driven in rotation by the turbine so as to compress intake air, and a bypass actuator for bypassing the turbine, the method comprising:
    measuring, via at least one sensor or estimator, a pressure downstream of the turbine, a pressure downstream of the compressor, a temperature upstream of the turbine, and a temperature upstream of the compressor;
    determining a compression ratio setpoint from a compressor map;
    measuring a compression ratio measurement across the compressor;
    determining an expansion ratio setpoint as a function of the compression ratio setpoint, of the compression ratio measurement, the pressure measurement downstream of the turbine, the pressure measurement downstream of the compressor, the temperature measurement upstream of the turbine, and the temperature measurement upstream of the compressor;
    determining a position setpoint for the bypass actuator as a function of the expansion ratio setpoint, and of a flowrate measurement of flowrate through the compressor; and
    actuating the bypass actuator to control an air flow rate of flow bypassing the turbine in response to the position setpoint as previously determined.

2. The method as claimed in claim 1, in which the determining of the position setpoint for the bypass actuator, as a function of the expansion ratio setpoint, uses an inverse actuator model.

3. The method as claimed in claim 2, in which the expansion ratio setpoint is, prior to use of the inverse actuator model, saturated as a function of a maximum authorized pressure downstream of the turbine, using formula:

$$PR_{t,sp,sat} = \min\left(PR_{t,sp}, \frac{P_{dt,max}}{P_{dt}}\right),$$

wherein
   $PR_{t,sp,sat}$ is the expansion ratio setpoint after saturation,
   $PR_{t,sp}$ is the expansion ratio setpoint before saturation,
   $P_{dt}$ is the pressure downstream of the turbine,
   $P_{dt,max}$ is the maximum acceptable pressure downstream of the turbine,
   the saturated compression ratio setpoint value thereafter replacing the initial compression ratio setpoint value.

4. The method as claimed in claim 2, in which the bypass actuator for bypassing the turbine is modeled by a Saint Venant equation, using formula $$W_{act} = S_{act}\frac{P_{dt}}{\sqrt{T_{dt}}} \cdot \psi(PR),$$

wherein
   PR denotes the input parameter, namely, respectively:
      $PR_{t,sp}$ the expansion ratio setpoint,
      $PR_{t,sp,ol}$ the open-loop expansion ratio setpoint,
      $PR_{t,sp,ol,sat}$ the saturated open-loop expansion ratio setpoint,
   $W_{act}$ is a flowrate through the actuator,
   $S_{act}$ is a cross section of the actuator,
   $P_{dt}$ is a pressure downstream of the turbine,
   $T_{dt}$ is a temperature downstream of the turbine,
   $\Psi$ is a function of the variable X, defined by $$\psi(X) = \sqrt{\frac{2\gamma_t}{R(\gamma_t - 1)}}\sqrt{X^{\frac{-2}{\gamma_t}} - X^{\frac{-(\gamma_t-1)}{\gamma_t}}},$$

wherein
   $\gamma_t$ is a first thermodynamic constant of the exhaust gas, equal to 1.4,
   R is the universal gas constant, equal to 287 J/kg/K.

5. The method of determining as claimed in claim 4, in which the flowrate through the actuator is determined using formula $W_{act}=W_{c,m}-W_{t,sp}$, wherein
   $W_{c,m}$ is a measurement of the flowrate through the compressor,
   $W_{t,sp}$ is a flowrate setpoint for the flowrate through the turbine.

6. The method of determining as claimed in claim 4, in which the cross section of the actuator is mapped as a function of the position setpoint for the actuator and of the expansion ratio setpoint.

7. The method as claimed in claim 1, in which the expansion ratio setpoint is equal to the sum of an open-loop expansion ratio setpoint calculated as a function of the compression ratio setpoint by a first logic module, and of a closed-loop expansion ratio setpoint calculated as a function of an error between the compression ratio setpoint and the compression ratio measurement by a second logic module,
   wherein the first logic module is a prepositioning module, and the second logic module is a first controller module.

8. The method as claimed in claim 7, in which the prepositioning module comprises:

determining a corrected flowrate measurement for the flowrate of intake air through the compressor as a function of a flowrate measurement for the flowrate of intake air through the compressor, using formula:

$$W_{c,m,cor} = W_{c,m} \cdot \sqrt{\frac{T_{uc}}{T_{c,ref}}} \cdot \frac{P_{c,ref}}{P_{dc}},$$

wherein
- $W_{c,m,cor}$ is the corrected flowrate measurement for the flowrate of intake air through the compressor,
- $W_{c,m}$ is the air flowrate measurement for the flowrate of intake air through the compressor,
- $T_{uc}$ is a temperature upstream of the compressor,
- $P_{uc}$ is a pressure upstream of the compressor,
- $T_{c,ref}$ is a reference temperature of the compressor,
- $P_{c,ref}$ is a reference pressure of the compressor;

determining a corrected speed setpoint relative to the compressor, using a function of the compression ratio and of the corrected flowrate of intake air through the compressor, the function being defined by a two-dimensional map;

determining a speed setpoint as a function of the corrected speed setpoint relative to the compressor, using formula:

$$N_{sp} = N_{sp,corc} \sqrt{\frac{T_{uc}}{T_{c,ref}}},$$

wherein
- $N_{sp}$ is the speed setpoint of the turbocharger,
- $N_{sp,corc}$ is the corrected speed setpoint relative to the compressor of the turbocharger,
- $T_c$ is the temperature upstream of the compressor,
- $T_{c,ref}$ is the reference temperature of the compressor;

calculating an efficiency of the compressor as a function of the corrected speed setpoint relative to the compressor of the turbocharger and of the corrected air flowrate setpoint for the flowrate of intake air through the compressor, using a function of the corrected speed setpoint relative to the compressor of the turbocharger and of the corrected air flowrate setpoint for the flowrate of intake air through the compressor, the function being defined by a two-dimensional map;

calculating a compressor power setpoint, using formula:

$$H_{c,sp} = W_{c,m} Cp_c \frac{1}{\eta_c} T_{uc} \left( PR_{c,sp}^{\frac{\gamma_c-1}{\gamma_c}} - 1 \right),$$

wherein
- $H_{c,sp}$ is the power setpoint of the compressor,
- $W_{c,m}$ is the air flowrate measurement for the flowrate of intake air through the compressor,
- $\eta_c$ is the efficiency of the compressor,
- $T_{uc}$ is the temperature upstream of the compressor,
- $PR_{c,sp}$ is the compression ratio setpoint of the compressor,
- $Cp_c$ is a first thermodynamic constant of the intake air,
- $\gamma_c$ is a second thermodynamic constant of the intake air;

calculating a turbine power setpoint using formula:

$H_{t,sp} = H_{c,sp}$, wherein
- $H_{t,sp}$ is the power setpoint of the turbine,
- $H_{c,sp}$ is the power setpoint of the compressor;

determining a corrected speed setpoint relative to the turbine as a function of the speed setpoint, using formula:

$$N_{sp,cort} = N_{sp} \sqrt{\frac{T_{t,ref}}{T_{ut}}},$$

wherein
- $N_{sp}$ is the speed setpoint of the turbocharger,
- $N_{sp,cort}$ is the corrected speed setpoint relative to the turbine of the turbocharger,
- $T_{ut}$ is a temperature upstream of the turbine,
- $T_{t,ref}$ is a reference temperature of the turbine;

calculating the open-loop expansion ratio setpoint, using formula:

$$PR_{t,sp,ol} = F^{-1}\left( \frac{H_{c,sp}}{Cp_t \cdot T_{ut} \cdot \frac{P_{dt}}{P_{t,ref}} \cdot \sqrt{\frac{T_{t,ref}}{T_{ut}}}}, N_{sp,cort} \right),$$

wherein
- $PR_{t,sp,ol}$ is the open-loop expansion ratio of the turbine,
- $H_{t,sp}$ is the power setpoint of the turbine,
- $N_{sp,cort}$ is the corrected speed setpoint relative to the turbine of the turbocharger, and
- F is a function defined by a two-dimensional map and obtained by inversion of the following equation:

$$H_{t,sp} = W_{t,sp} \cdot Cp_t \cdot \eta_t \cdot T_{ut} \left[ 1 - \left( \frac{1}{PR_{t,sp,ol}} \right)^{\frac{\gamma_t-1}{\gamma_t}} \right],$$

wherein
- $H_{t,sp}$ is the power setpoint of the turbine,
- $PR_{t,sp,ol}$ is the open-loop expansion ratio of the turbine,
- $Cp_t$ is a first thermodynamic constant of the exhaust gas,
- $\gamma_t$ is a second thermodynamic constant of the exhaust gas,
- $\eta_t$ is an efficiency of the turbine that can be expressed by means of a function of the corrected speed setpoint relative to the turbine of the turbocharger and of the open-loop expansion ratio setpoint, the function being defined by a two-dimensional map,
- $W_{t,sp}$ is a flowrate setpoint for the flowrate of exhaust gases through the turbine and determined by formula $$W_{t,sp} = W_{t,sp,cor} \cdot \sqrt{\frac{T_{t,ref}}{T_{ut}}} \cdot \frac{P_{dt}}{P_{t,ref}},$$

wherein
- $W_{t,sp}$ is a flowrate setpoint for the flowrate of exhaust gases through the turbine,
- $W_{t,sp,cor}$ is a corrected flowrate setpoint for the flowrate of exhaust gases through the turbine that can be expressed by a function of the corrected speed setpoint relative to the turbine of the turbocharger and of the open-loop expansion ratio setpoint, the function being defined by a two-dimensional map,
- $T_{ut}$ is a temperature upstream of the turbine, $T_{t,ref}$ is a reference temperature of the turbine,
$P_{dt}$ is a pressure downstream of the turbine,
$P_{t,ref}$ is a reference pressure of the turbine.

9. The method as claimed in claim 7, in which the first controller module is a regulator configured to cancel the error.

10. The method as claimed in claim 9, in which the regulator uses fuzzy logic.

11. The method as claimed in claim 9, in which the regulator comprises a Proportional Integral Derivative module.

12. The method as claimed in claim 1, in which the position setpoint for the bypass actuator is equal to the sum of an open-loop position setpoint calculated as a function of the compression ratio setpoint, and of a closed-loop position setpoint calculated as a function of an error between the compression ratio setpoint and the compression ratio measurement by a second controller module.

13. The method as claimed in claim 12, in which the determining of the open-loop position setpoint comprises:
    determining an open-loop expansion ratio setpoint as a function of the compression ratio setpoint by a prepositioning module; and
    determining of an open-loop position setpoint as a function of the open-loop expansion ratio setpoint thus determined, using an inverse actuator model.

14. The method as claimed in claim 12, in which the position setpoint is finally saturated, using formula:

$$\alpha_{sp,sat} = \min(\alpha_{sp}, \alpha_{sp,max}),$$

wherein
$\alpha_{sp,sat}$ is the position setpoint after saturation,
$\alpha_{sp}$ is the position setpoint before saturation,
$\alpha_{sp,max}$ is a maximum position setpoint.

15. The method as claimed in claim 14, in which the maximum position setpoint is determined as a function of the open-loop expansion ratio using an inverse actuator model.

16. The method as claimed in claim 15, in which the open-loop expansion ratio setpoint is, prior to application of the inverse actuator model for determining the maximum position setpoint $\alpha_{sp,max}$, saturated as a function of a maximum authorized pressure downstream of the turbine, using formula:

$$PR_{t,sp,sat} = \min\left(PR_{t,sp,ol}, \frac{P_{dt,max}}{P_{dt}}\right),$$

wherein
$PR_{t,sp,sat}$ is the expansion ratio setpoint after saturation,
$PR_{t,sp,ol}$ is the expansion ratio setpoint before saturation,
$P_{dt}$ is the pressure downstream of the turbine,
$P_{dt,max}$ is the maximum acceptable pressure downstream of the turbine,
the saturated expansion ratio setpoint value thereafter replacing the initial open-loop expansion ratio setpoint value.

17. A method, for a fixed geometry double supercharging device for supercharging a combustion engine, comprising:
    a high-pressure first turbocharger comprising a high-pressure turbine driven by the exhaust gases emanating from the combustion engine, a high-pressure compressor driven in rotation by the high-pressure turbine so as to compress the intake air injected into the combustion engine, and a high-pressure bypass actuator for bypassing the high-pressure turbine making it possible to command an air flowrate that does not pass through the high-pressure turbine;
    a low-pressure second turbocharger comprising a low-pressure turbine driven by the exhaust gases emanating from the combustion engine via the high-pressure turbine or the high-pressure bypass actuator, a low-pressure compressor driven in rotation by the low-pressure turbine so as to compress the intake air injected into the combustion engine via the high-pressure compressor, and a low-pressure bypass actuator for bypassing the low-pressure turbine making it possible to command an air flowrate that does not pass through the low-pressure turbine; and
    a bypass valve for the high-pressure compressor allowing the high-pressure compressor to be selectively bypassed so as to connect the low-pressure compressor directly to the engine,
    the method comprising for both the high-pressure turbocharger and the low-pressure turbocharger:
    measuring a pressure downstream of each turbine, a pressure downstream of each compressor, a temperature upstream of each turbine, and a temperature upstream of each compressor via at least one sensor or estimator;
    determining a compression ratio setpoint from a compressor map;
    measuring a compression ratio measurement across the compressor;
    determining an expansion ratio setpoint as a function of the compression ratio setpoint, the compression ratio measurement, the pressure measurement downstream of each turbine, the pressure measurement downstream of each compressor, the temperature measurement upstream of each turbine, and the temperature measurement upstream of each compressor;
    determining a position setpoint for each bypass actuator as a function of each expansion ratio setpoint, and of a flowrate measurement of flowrate through each compressor;
    selecting, by a handler, which bypass actuator out of the high-pressure bypass actuator and the low-pressure bypass actuator to command;
    accordingly selecting the position setpoint for the high-pressure bypass actuator or the position setpoint for the low-pressure bypass actuator; and
    actuating the selected bypass actuator in response to the selected position setpoint.

18. The method as claimed in claim 17, in which the selecting is carried out by the handler in accordance with the following rules:
    the high-pressure bypass actuator is operated when the speed of the engine is below a threshold, the bypass valve of the high-pressure compressor being forced closed and the low-pressure bypass actuator being forced closed; and
    the low-pressure bypass actuator is operated when the speed of the engine is above a threshold, the bypass valve of the high-pressure compressor being forced open and the high-pressure bypass actuator being forced open.

19. The method as claimed in claim 18, in which the threshold speed for the engine is equal to 2750 rpm.

* * * * *